(12) United States Patent
Chou et al.

(10) Patent No.: US 10,613,950 B2
(45) Date of Patent: Apr. 7, 2020

(54) CMC FAILOVER FOR TWO-STICK CANISTERS IN RACK DESIGN

(71) Applicant: QUANTA COMPUTER INC., Taoyuan (TW)

(72) Inventors: Le-Sheng Chou, Taoyuan (TW); Tien-Jung Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 224 days.

(21) Appl. No.: 15/968,382

(22) Filed: May 1, 2018

(65) Prior Publication Data

US 2019/0213091 A1 Jul. 11, 2019

Related U.S. Application Data

(60) Provisional application No. 62/613,855, filed on Jan. 5, 2018.

(51) Int. Cl.
  *G06F 11/00* (2006.01)
  *G06F 11/20* (2006.01)
  (Continued)

(52) U.S. Cl.
  CPC ...... *G06F 11/2023* (2013.01); *G06F 11/2015* (2013.01); *G06F 11/2025* (2013.01);
  (Continued)

(58) Field of Classification Search
  CPC ........ G06F 11/3058; G06F 1/28; G06F 1/266; G06F 1/30; G06F 2201/86
  See application file for complete search history.

(56) References Cited

U.S. PATENT DOCUMENTS 9,317,394 B2 *  4/2016  Sakurai ............... G06F 11/2025
9,665,154 B2 *  5/2017  Haridass .............. G06F 9/5094
(Continued)

FOREIGN PATENT DOCUMENTS

EP      3261420 A1     12/2017
JP      2009-524151 A   6/2009
(Continued)

OTHER PUBLICATIONS

TW Office Action for Application No. 107121357, dated Jan. 29, 2019, w/ First Office Action Summary.
(Continued)

*Primary Examiner* — Loan L.T. Truong
(74) *Attorney, Agent, or Firm* — Nixon Peabody LLP; Zhou Lu

(57) ABSTRACT

A dual CMC structure is disclosed for a rack mounted structure. The structure has a first chassis with power supplies, a first chassis management controller, and a first set of network devices. A second chassis includes power supplies, a second chassis management controller and a second set of network devices. The respective chassis management controllers obtain status data of the power supplies, as well as status data from the other chassis management controllers. The first chassis management controller is designated as the master controller and reports the status data from both the first and second chassis. The structure is operable to change communication of the status data to the second chassis management controller, in the event the first chassis management controller fails.

17 Claims, 7 Drawing Sheets

(51) Int. Cl.
  *G06F 13/40*    (2006.01)
  *G06F 11/30*    (2006.01)
(52) U.S. Cl.
  CPC ...... *G06F 11/3048* (2013.01); *G06F 11/3055* (2013.01); *G06F 11/3058* (2013.01); *G06F 13/4022* (2013.01); *G06F 2201/805* (2013.01); *G06F 2213/0016* (2013.01)

(56) References Cited

U.S. PATENT DOCUMENTS

| | | | | |
|---|---|---|---|---|
| 9,778,722 | B2* | 10/2017 | Cepulis | G06F 1/183 |
| 10,382,534 | B1* | 8/2019 | Sharma | H04L 67/1023 |
| 10,402,207 | B2* | 9/2019 | Ku | G06F 13/362 |
| 10,505,843 | B2* | 12/2019 | Ragupathi | H04L 45/54 |
| 2003/0177224 | A1 | 9/2003 | Nguyen | |
| 2003/0188051 | A1 | 10/2003 | Hawkins et al. | |
| 2004/0246982 | A1* | 12/2004 | Krishnamurthy | H04L 49/40 370/422 |
| 2008/0034239 | A1* | 2/2008 | Lambert | G06F 1/14 713/323 |
| 2010/0146592 | A1* | 6/2010 | Gamare | G06F 11/2025 726/4 |
| 2010/0180161 | A1* | 7/2010 | Kern | G06F 11/2028 714/47.2 |
| 2010/0229028 | A1 | 9/2010 | Doushita et al. | |
| 2012/0076003 | A1* | 3/2012 | Wong | H05K 7/1459 370/242 |
| 2012/0134085 | A1* | 5/2012 | Gau | H05K 7/1498 361/679.02 |
| 2012/0137158 | A1* | 5/2012 | Nelluri | G06F 1/3203 713/340 |
| 2013/0173810 | A1 | 7/2013 | Subramaniam | |
| 2013/0268697 | A1* | 10/2013 | Lambert | G06F 13/4022 710/11 |
| 2014/0052309 | A1* | 2/2014 | Chandrasekhar | G06F 1/26 700/297 |
| 2014/0254352 | A1* | 9/2014 | Natarajan | H04L 45/28 370/228 |
| 2014/0344389 | A1* | 11/2014 | Hsieh | G06F 13/362 709/208 |
| 2015/0032925 | A1* | 1/2015 | Chidester | G06F 13/36 710/110 |
| 2015/0177814 | A1* | 6/2015 | Bailey | G06F 1/3234 713/320 |
| 2015/0178095 | A1* | 6/2015 | Balakrishnan | G06F 13/364 710/110 |
| 2015/0248315 | A1* | 9/2015 | Ragupathi | H04L 41/0806 709/226 |
| 2015/0363340 | A1* | 12/2015 | Kelly | G06F 13/102 710/52 |
| 2016/0070627 | A1* | 3/2016 | Huang | G06F 11/2025 714/4.12 |
| 2016/0353599 | A1* | 12/2016 | Bailey | H05K 7/1485 |
| 2017/0010652 | A1* | 1/2017 | Huang | G06F 11/0751 |
| 2017/0083457 | A1* | 3/2017 | Khemani | G06F 12/1408 |
| 2017/0132062 | A1* | 5/2017 | Shetty | H04L 41/0659 |
| 2017/0142769 | A1* | 5/2017 | Gilbert | H04L 69/40 |
| 2017/0289300 | A1* | 10/2017 | Song | H04L 63/08 |
| 2017/0364375 | A1* | 12/2017 | Ku | G06F 9/44505 |
| 2018/0267870 | A1* | 9/2018 | Bhatia | G06F 11/2028 |
| 2018/0278468 | A1* | 9/2018 | Rao | H04L 41/0663 |
| 2019/0215980 | A1* | 7/2019 | Rhinehart | G06F 11/3034 |
| 2019/0237980 | A1* | 8/2019 | Yang | G01R 31/36 |
| 2019/0296958 | A1* | 9/2019 | Cencini | G06F 1/189 |

FOREIGN PATENT DOCUMENTS

| | | |
|---|---|---|
| JP | 2013-197349 A | 9/2013 |
| JP | 2016-505917 A | 2/2016 |
| WO | 2010018635 A1 | 2/2010 |

OTHER PUBLICATIONS

TW Search Report for Application No. 107121357, dated Jan. 29, 2019, w/ First Office Action.
Extended European Search Report for Application No. EP18181415.3, dated Apr. 5, 2019.
JP Office Action for Application No. 2018-127326, dated Sep. 24, 2019, w/ First Office Action Summary.

\* cited by examiner

CMC FAILOVER FOR TWO-STICK CANISTERS IN RACK DESIGN

PRIORITY CLAIM

This application claims priority to U.S. Provisional Application No. 62/613,855, filed on Jan. 5, 2018. The contents of that application are hereby incorporated by reference in their entirety.

TECHNICAL FIELD

The present disclosure relates generally to a chassis for operating multiple network devices. More particularly, aspects of this disclosure relate to networking two or more chassis management controllers to monitor operation of chassis mounted network devices.

BACKGROUND

The emergence of the cloud for computing applications has increased the demand for off-site installations, known as data centers, that store data and run applications accessed by remotely connected computer device users. Such data centers typically have massive numbers of servers, switches, and storage devices to store and manage data, so they may be accessed in a convenient manner by remote computer users. A typical data center has physical rack structures with attendant power and communication connections. The racks are arranged in rows throughout the room or rooms of the data center. Each rack includes a frame that has horizontally oriented slots or a chassis that may hold multiple devices such as servers, switches and storage devices. There are many such devices stacked in such rack structures found in a modern data center. For example, some data centers have tens of thousands of servers, and attendant storage devices, and network switches. Thus, a typical data center may include tens of thousands, or even hundreds of thousands, of devices in hundreds or thousands of individual racks. Data centers typically have an administrative system in a control center to monitor and insure proper operation of the equipment. For efficient management, an administrator relies on instantaneous knowledge of the status of the equipment in each of the racks in the data center.

A typical rack system 10 is shown in FIG. 1. The rack system 10 includes a chassis management controller (CMC) 12 that is coupled to a power shelf 14. The power shelf 14 includes a number of power supply units and corresponding fans for cooling. The power shelf 14 is connected to network device banks 16 and 18, and provides power to each of the network devices in the banks 16 and 18. In this example, the network devices in the network device banks 16 and 18 may be blade servers. The rack system 10 also includes a management switch 20 and two data switches 22 and 24. The management switch 20 monitors the operation of the network devices stored in the banks 16 and 18, including power supplies on the power shelf 14. The data switches 22 and 24 provide data communication between the network devices stored in the banks 16 and 18.

The CMC 12 manages the network devices in the banks of network devices 16 and 18. The CMC 12 performs configuration and monitoring tasks, controls power to the network devices in the banks 16 and 18; and provides alerts for the network devices in the banks 16 and 18. The CMC 12 has a microprocessor and memory. The CMC 12 is powered by the power supplies on the power shelf 14.

The CMC 12 plays an important role in management of the rack 10 in a data center. The CMC 12 collects rack based operation information from the rack 10 for data center management software. The operation information may include: (1) rack total power consumption; (2) an IP address list from each of the network devices; (3) overall and individual rack component health status; and (4) rack based fan and thermal status. Such information may be used by data center management software to perform functions, such as capping rack power or updating rack IDs, to all management units of the rack, such as the CMC 12 or a rack management controller on the management switch 20. Thus, a data center administrator may remotely monitor the performance of the devices in each rack system in the data center by the collection of such information.

There are some well-known ways to implement the communication with the components on the power shelf 14 for the CMC 12. For example, the CMC 12 may use an inter-integrated circuit protocol (I2C); a universal asynchronous receiver/transmitter (UART); or a network to communicate operational data from the power shelf 14 with the management switch 20.

In operation, the CMC 12 periodically polls status of the power shelf 14. A remote administrator may send a command to get the power shelf status through a management switch such as the management switch 20. The CMC 12 then reports the status of the power shelf 14 according to the request from the remote administrator. When an alert is activated, the CMC 12 will actively report the status of the power shelf 14 to the remote management node to enhance the response to a potential situation such as a potential failure.

Generally, there is only one CMC for each canister, or rack such as rack 10, in FIG. 1. However, a remote administrator of a data center loses the ability to conduct status monitoring of the canister or rack power shelf 14 if the CMC 12 fails or goes off line. This impedes the operation of the rack 10 since problems will not be reported from the overall power and support provided from the rack 10.

Thus, the failure of the CMC 12 will impede the operation of all of the network devices in the rack 10. In a normal condition, the CMC 12 inside the canister or rack 10 will monitor the status of the power shelf 14 and report the status to a management node. The failure or malfunction of the CMC 12 will prevent monitoring of the network devices, and therefore operation must be halted until the unit may be inspected. Some current rack designs include a backup CMC to report the canister or rack status to a remote administrator should the first CMC fail. However, this is not a perfect solution because both CMCs may be cutoff from communication from the remote administrator. Further, if both CMCs on the canister fail, operation must be halted.

There is therefore a need for a rack system that allows remote monitoring of the support shelf status, even if a CMC goes off line. There is a further need for a mechanism to allow the operation of a rack, even if a CMC fails to report monitoring data of the devices on the rack. There is a further need for a rack system with multiple CMCs that collect status monitoring data for multiple devices in a rack.

SUMMARY

One disclosed example is an equipment rack including a management controller and a first and second chassis. The first chassis includes a first power supply unit; a first system bus coupled to the first power supply unit; a first chassis management controller coupled to the first system bus; and a first network device. The first power supply unit sends status data to the first system bus. The second chassis includes a second power supply unit; a second system bus coupled to the second power supply unit; a second chassis management controller coupled to the second system bus; and a second network device. The second power supply unit sends status data to the second system bus. The first chassis management controller is in communication with the first system bus to obtain status data from the first power supply unit. The first chassis management controller is in communication with the second system bus to obtain status data from the second power supply unit. The first chassis management controller is in communication with the management switch to relay the status data. The second chassis management controller is in communication with the first system bus to obtain status data from the first power supply unit. The second chassis management controller is in communication with the second system bus to obtain status data from the second power supply unit. The management controller is operable to establish communication between the management controller and the second chassis management controller to relay the status data.

Another disclosed example is a method of ensuring status reporting from an equipment rack. The equipment rack has a management controller. The equipment rack has a first chassis including a first power supply unit; a first system bus; and a first chassis management controller and a first network device. The equipment rack has a second chassis including a second power supply unit; a second system bus; a second chassis management controller; and a second network device. Status data is provided from the first power supply unit to the first system bus. Status data is provided from the second power supply unit to the second system bus. Communication is established between the first chassis management controller and the first system bus to obtain status data from the first power supply unit. Communication is established between the first chassis management controller and the second system bus to obtain status data from the second power supply unit. Status data is relayed via the first chassis management controller to the management switch. Communication is established between the second chassis management controller and the second system bus to obtain status data from the second power supply unit. Communication is established between the second chassis management controller and the first system bus to obtain status data from the first power supply unit. On determining that status data from the first chassis management controller is not relayed, the relay of status data via the second chassis management controller is initiated to the management controller.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
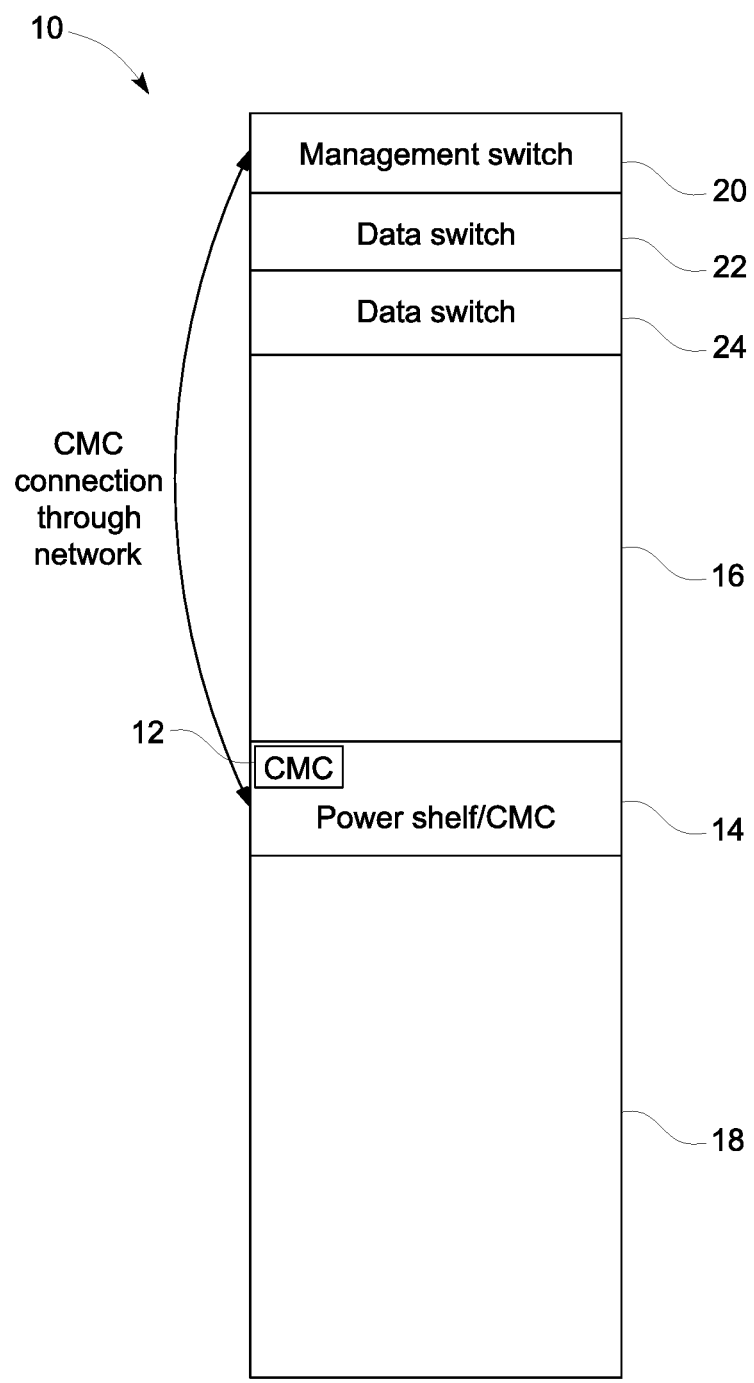
FIG. 1 is an example of a prior art rack system having a single CMC to monitor rack operational data.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
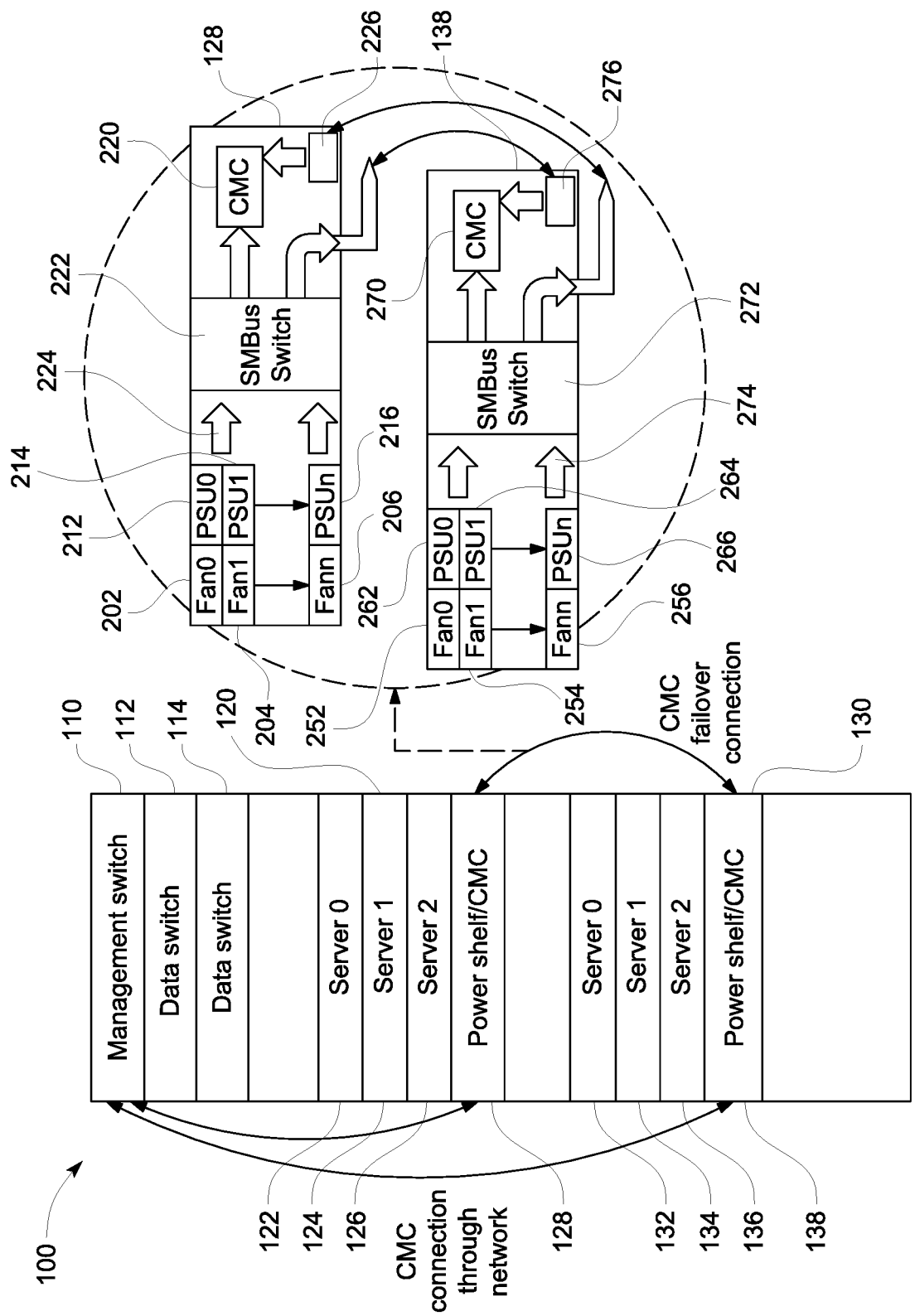
FIG. 2 is a block diagram of components in an example rack that includes a partner CMC that allows continued reporting in the event of failure of a master CMC.

FIG. 2 shows an example dual chassis canister rack 100 that includes multiple CMCs on different shelves or boards in different chassis units to allow operation data monitoring of all the devices on the rack 100 despite the failure of a single CMC or multiple CMCs on a single board. The addition of at least one partner CMC on a separate chassis to obtain the operation data status allows continuous monitoring and therefore operation of the rack 100 even if the master CMC fails to provide the status information.

The rack 100 includes a management switch 110, and two data switches 112 and 114. The rack 100 includes a first chassis unit 120 and a second chassis unit 130. The management switch 110 may include a controller that serves as a management controller to monitor the operation of all devices on the rack 100. The first chassis unit 120 includes various network devices such as servers 122, 124, and 126. The chassis unit 120 also includes a power shelf 128 that houses power supply units and other supporting electronics for the servers 122, 124, and 126 of the chassis unit 120. The other chassis unit 130 includes various network devices such as servers 132, 134, and 136. The chassis unit 130 also includes a power shelf 138 that houses power supply units and other supporting electronics for the network devices 132, 134, and 136 of the chassis unit 130. For example, the chassis units 120 and 130 may have parallel side walls that hold mounting mechanisms that define slots. The power shelf may be mounted in any location in the chassis unit. The respective network devices may be inserted in the slots and connected to the power supply units on the respective power shelves.

FIG. 2 also shows block diagrams of the power shelves 128 and 138. The power shelf 128 includes a series of power supply units 202, 204, and 206. Each of the power supply units 202, 204, and 206 has a corresponding fan 212, 214, and 216. The power shelf 128 includes a CMC 220 that monitors the operations of the power shelf 128. In this example, the power shelf 128 provides power to associated network devices such as the servers 122, 124, and 126. A system management (SM) bus switch 222 is in communication with the power supply units 202, 204, 206 and fans 212, 214, and 216 via a system bus 224. The SM bus switch 222 functions to receive operational data and communicates on/off commands to the power supply units 202, 204, and 206, and fans 212, 214, and 216. The CMC 220 is coupled to a network interface 226 and is coupled to the SM bus switch 222.

Similarly, the power shelf 138 includes a series of power supply units 252, 254, and 256. Each of the power supply units 252, 254, and 256 has a corresponding fan 262, 264, and 266. The power shelf 138 includes a CMC 270 that monitors the operations of the power shelf 138. In this example, the power shelf 138 provides power to associated network devices such as the servers 132, 134, and 136. A system management (SM) bus switch 272 is in communication with the power supply units 252, 254, and 256, and fans 262, 264, and 266 via a system bus 274. The SM bus switch 272 functions to receive operational data and communicates on/off commands to the power supply units 252, 254, 256, and fans 262, 264, and 266. The CMC 270 is coupled to a network interface 276, and is coupled to the SM bus switch 272.

As shown in FIG. 2, the CMCs 220 and 270 are connected through a network via the respective network interfaces 226 and 276 to the management switch 110. The network interface 226 is also connected to the SM bus switch 272. The network interface 276 is connected to the SM bus switch 222. As explained below, this arrangement allows either CMC 220 or 270 to monitor and control either power shelf 128 or 138.

In this example, the CMC 220 is the master CMC for the rack 100 and the CMC 270 is a partner CMC. Of course, the CMC 270 can serve as the master CMC while the CMC 220 serves as the partner CMC for the rack 100. In instances where additional chassis units with CMCs are installed in the rack 100, such other CMCs may serve as the master CMC. In this example, the CMC 220 periodically polls the power shelf status of the power shelf 128 via the SM bus switch 222. In this manner, the CMC 220 collects operational status data of the power supply units 202, 204, 206, and fans 212, 214, and 216. The CMC 220 also polls the partner CMC 270 for the status of the power shelf 138. The CMC 270 collects such status data via the SM bus switch 272 for operational status data of the power supply units 252, 254, 256, and fans 262, 264, and 266.

A remote administrator may send a command to obtain the power shelf status from the management switch 110 through the network connection to the CMC 220. The CMC 220 then reports the power shelf status in response to the request from the remote administrator through the management switch 110. The redundant CMCs 220 and 270 can communicate with each other through connections such as I2C, CPIO, UART or a similar network protocol. A hand shake between the two CMCs 220 and 270 is made through heartbeat negotiation over the suitable protocol. In this example, the negotiation may be made through a protocol such as I2C, CPIO, UART or a similar network. Thus, the CMCs 220 and 270 may exchange power status information from their respective power shelves 128 and 138. If one of the CMCs 220 or 270 discovers the other CMC is out of service through the communication, that CMC will take over the monitoring function.

In cases where the CMC 220 fails, the partner CMC 270 may detect that the original master CMC has failed or the network connection to the management switch 110 is broken. Alternatively, a management controller such as the controller of the management switch 110 may detect the failure of communication from the original master CMC. The partner CMC 270 will then take over the responsibility to report status data to the remote administrator and send an alert to remote administrator that the partner CMC already has taken over these functions. Thus, the information reported to the remote administrator will be the same as if the original master CMC is still functional.

Figure 3:
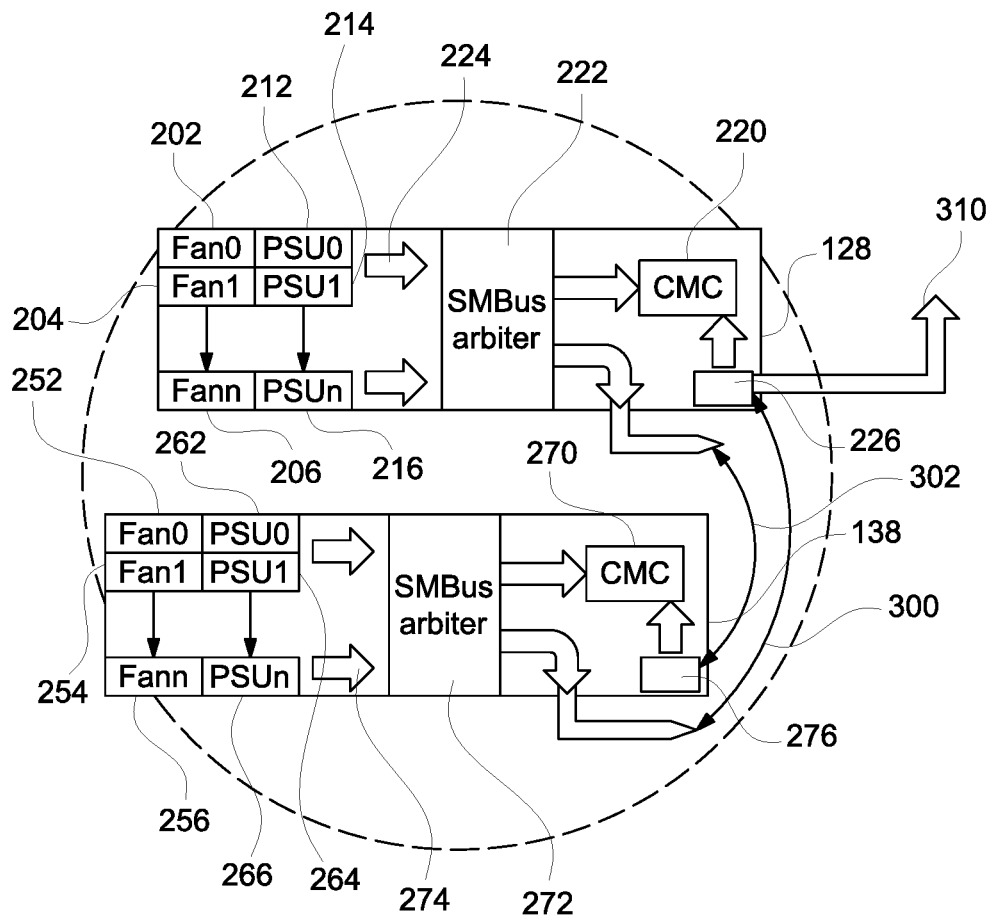
FIG. 3 is a block diagram of the components of the example rack in FIG. 2 showing the ability of the CMCs to monitor respective power shelves.

FIG. 3 shows the power shelf 128 and power shelf 138 where the CMC 220 is designated as a master CMC. Like elements in FIG. 3 are labeled with like element numbers in FIG. 2. In normal operation, both of the CMCs 220 and 270 actively read all sensor information from the respective power supply units on the respective power shelves 128 and 138. One of the CMCs, such as the CMC 220, is designated as the master CMC. In this example, the CMC 270 is a partner CMC and directs collected status information from the SMbus switch 272 to be sent directly to the CMC 220 as shown by a line 300 in FIG. 3. The CMC 220 also directed collected status information from the SMbus switch 222 to be sent to the CMC 270 as shown by a line 302. The CMC 220, designated as the master CMC, reports the status of all of the components on both power shelves 128 and 138 to remote management via the network connection to the management switch 110 (in FIG. 2). The connection may be seen by a line 310 that shows the active transmission of data to the management switch 110. Since both CMCs 220 and 270 can get information through the respective SMBus switches 222 and 272, both CMCs 220 and 270 are synced at all times. The operational or status data transmitted from the CMC 220 to the management switch may be via an inter-integrated circuit protocol (I2C); a universal asynchronous receiver/transmitter (UART); or a network.

Figure 4:
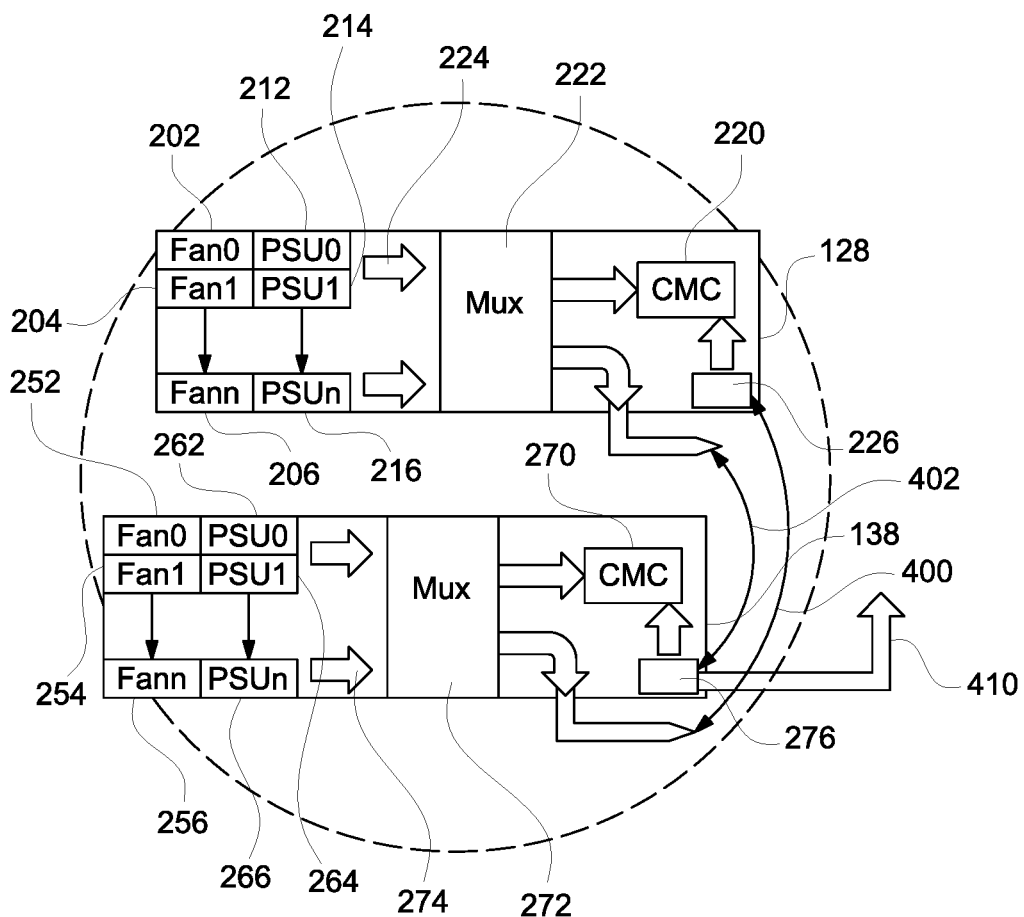
FIG. 4 is a block diagram of the components of the example rack in FIG. 2 showing to flow of status data from a normally operated master CMC.

FIG. 4 shows the power shelf 128 and power shelf 138, where the CMC 220 is not communicating with the management switch 110. Like elements in FIG. 4 are labeled with like element numbers in FIG. 2. The lack of communication from the CMC 220 may be because of a failure of the CMC 220 or a breakdown in the communication line. Both of the CMCs 220 and 270 actively read all sensor information from the respective power supply units on the respective power shelves 128 and 138. In this example, the CMC 270 is a partner CMC and directs collected status information from the SMbus switch 272 to be sent directly to the CMC 220 as shown by a line 400. The CMC 220 also directs collected status information from the SMbus switch 222 to be sent to the CMC 270 as shown by a line 402. In this case, the system switches to a partner CMC, such as the CMC 270, that initiates communication with the management switch 110 (in FIG. 2) The connection may be seen by a line 410 that shows the active transmission of data to the management switch 110. The operational or status data transmitted from the CMC 270 to the management switch 110 may be via an inter-integrated circuit protocol (I2C), a universal asynchronous receiver/transmitter (UART), or a network.

It is to be understood that other devices may be used for the SMbus switches 222 and 272 as long as such devices can switch the attached SMbus from one to another. For example, a SMBus arbiter that can communicate to inputs from different SMBuses at the same time may be used. The SMBus arbiter can play the arbitrator of which bus can talk to the target first. Alternatively, a multiplexor may also be used to select the bus for communication to the target.

Figure 5:
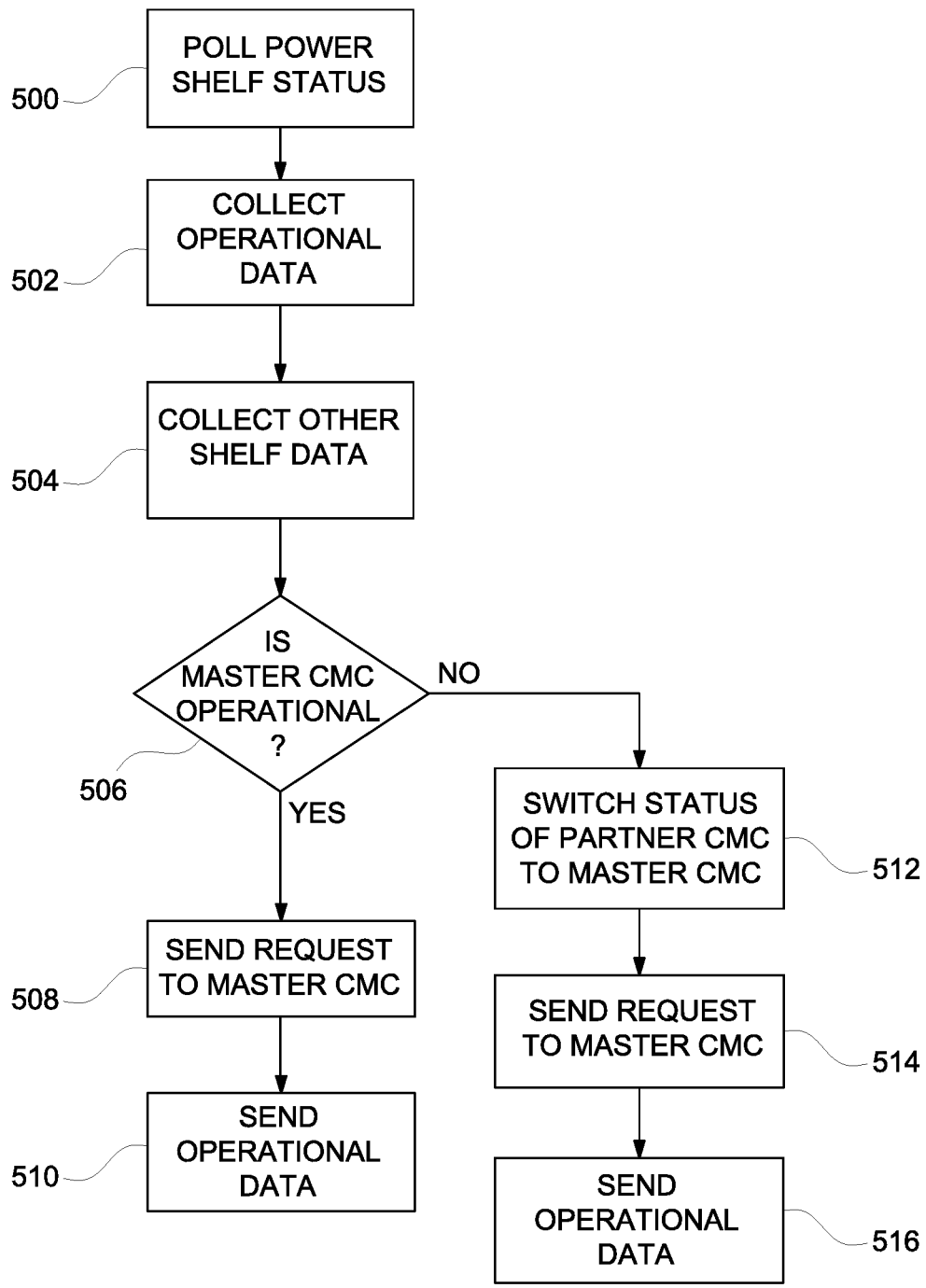
FIG. 5 is a flow diagram of the process operated by a management controller to maintain information and switch the master CMC function to the partner CMC.

The flow diagram in FIG. 5 is representative of example machine readable instructions for the rack 100 in FIG. 2 to ensure the flow of status information from one of the CMCs in FIG. 2. In this example, the machine readable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowchart of FIG. 5 may be implemented manually. Further, although the example algorithm is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 shows an example flow diagram of the process of operating the example rack 100 to ensure monitoring of the chassis units 120 and 130 (in FIG. 2). In this example, each of the CMCs in FIG. 2 such as the CMC 220 and CMC 270 poll the respective power shelf status (500). Each of the CMCs collects the operational status data from the bus switch such as the bus switch 222 in FIG. 2 (502). The CMCs also poll all partner CMCs for the status of the respective power shelves monitored by partner CMCs (504). The management controller of the management switch 110 (in FIG. 2) determines whether the master CMC 220 is operational (506). If the master CMC 220 is operational, the management switch 110 sends a request to obtain power shelf status to the master CMC 220 (508). On receiving the request, the CMC 220 sends the collected operational data for each of the shelves (510).

If the current master CMC is not operational, the management switch 110 switches the status of the CMC 270 to assume the role of the master CMC (512). The management switch 110 then sends a request to obtain power shelf status to the new master CMC 270 (514). On receiving the request, the CMC 270 then sends the collected operational data for each of the shelves to the management switch 110 (516).

Figure 6:
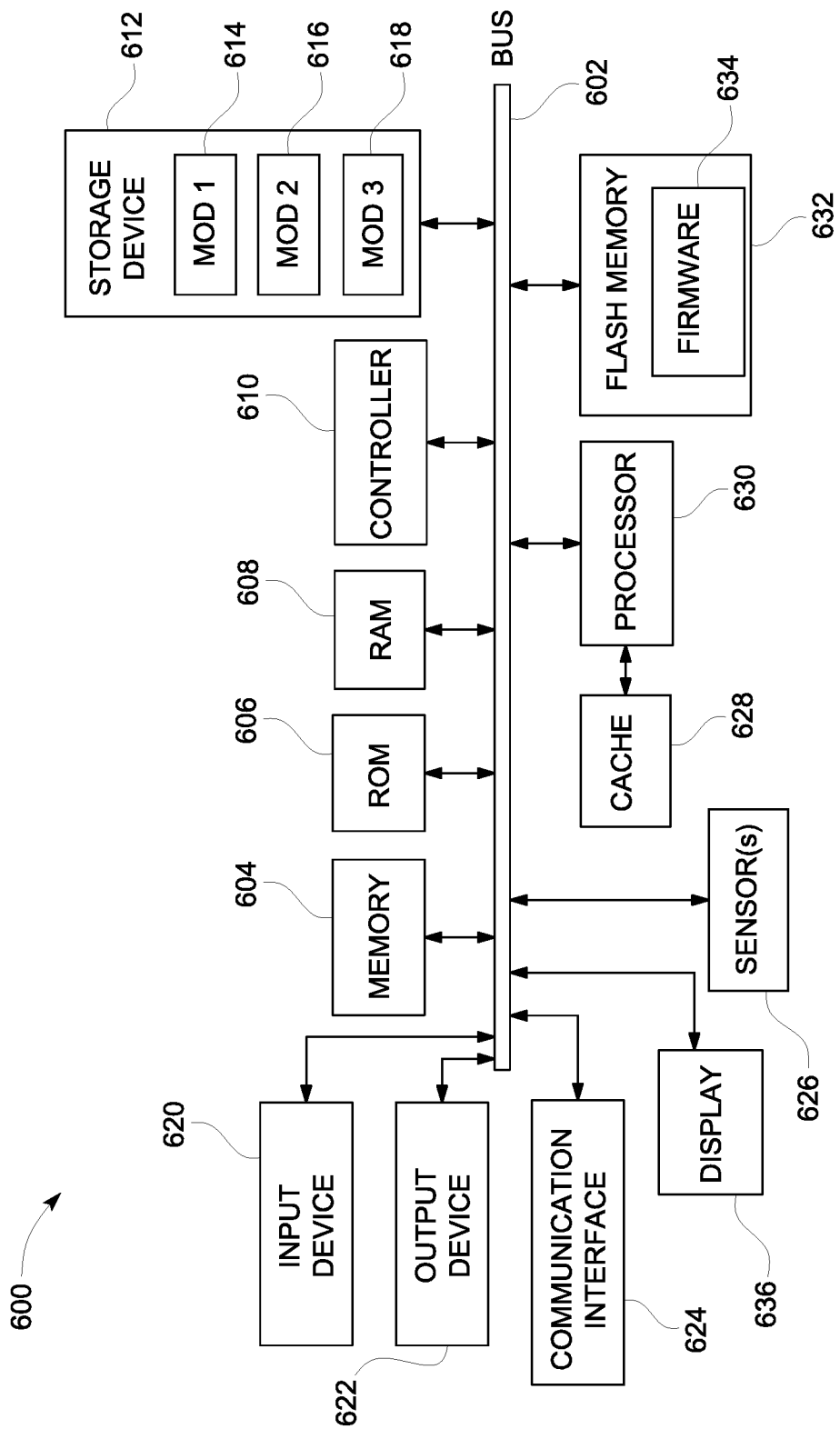
FIGS. 6 and 7 illustrate exemplary systems in accordance with various examples of the present disclosure.

FIG. 6 illustrates an example computing system 600, in which the components of the computing system are in electrical communication with each other using a bus 602. The system 600 includes a processing unit (CPU or processor) 630; and a system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system, containing multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that are accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

Figure 7:
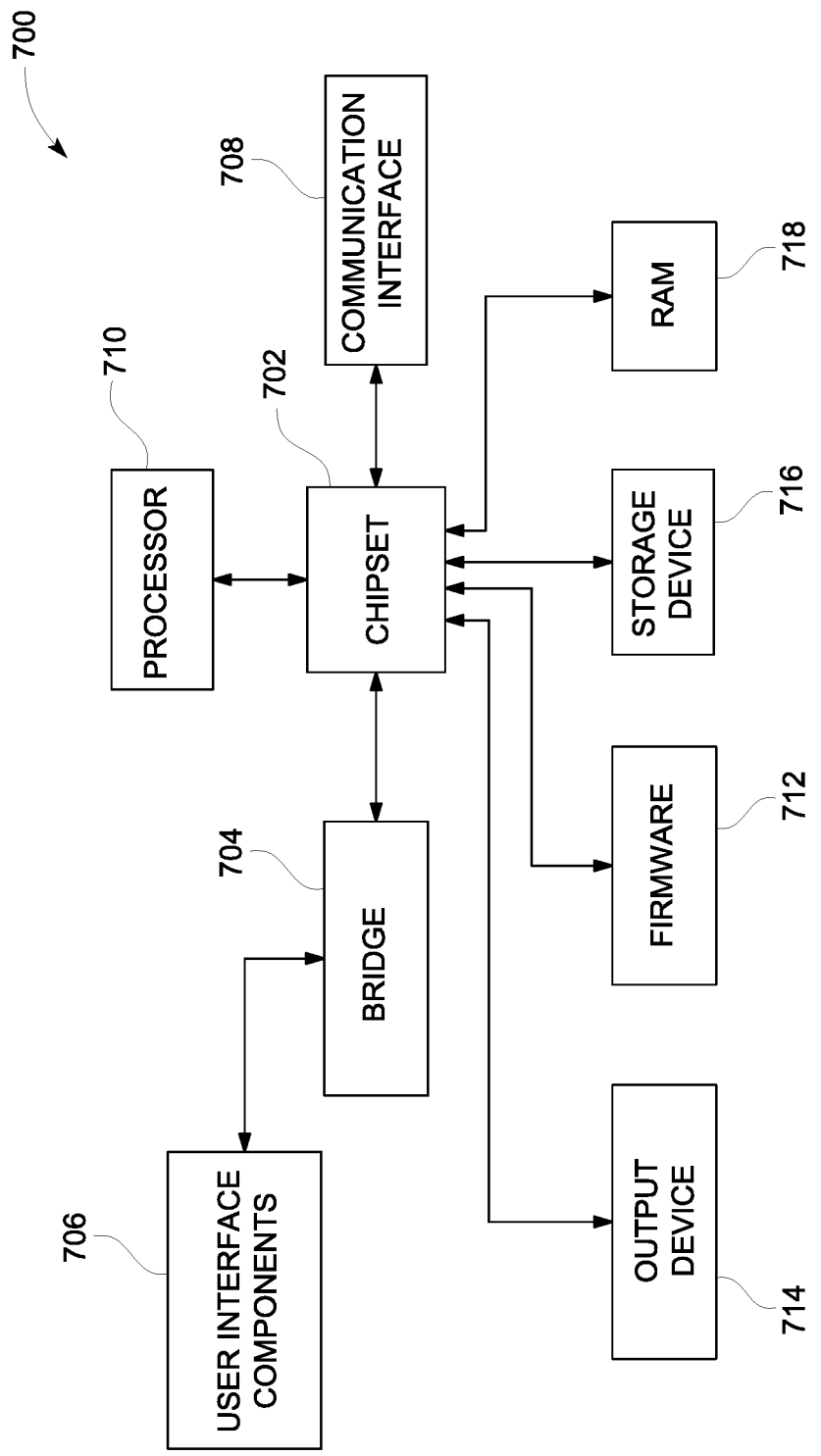

FIG. 7 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 6) and 700 can have more than one processor (e.g., 630, 710), or be part of a group or cluster of computing devices networked together to provide greater processing capability.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An equipment rack, comprising:
    a management controller;
    a first chassis including a first power supply unit, a first system bus coupled to the first power supply unit, a first chassis management controller coupled to the first system bus, and a first network device, wherein the first power supply unit sends status data to the first system bus;
    a second chassis including a second power supply unit, a second system bus coupled to the second power supply unit, a second chassis management controller coupled to the second system bus, and a second network device, wherein the second power supply unit sends status data to the second system bus;
    wherein the first chassis management controller is in communication with the first system bus to obtain status data from the first power supply unit, and the second system bus to obtain status data from the second power supply unit, and wherein the first chassis management controller is in communication with the management controller to relay the status data; and
    wherein the second chassis management controller is in communication with the first system bus to obtain status data from the first power supply unit, and the second system bus to obtain status data from the second power supply unit; and
    wherein the system is operable to establish communication between the management controller and the second chassis management controller to relay the status data.

2. The equipment rack of claim 1, wherein the first power supply is one of a plurality of power supplies, each of the plurality of power supplies providing status data to the first system bus.

3. The equipment rack of claim 1, wherein the first network device is one of a plurality of network devices on the first chassis.

4. The equipment rack of claim 1, further comprising a data switch connected to the first network device, the data switch in communication with one of the first or second network devices.

5. The equipment rack of claim 1, wherein the chassis management controller communicates with a management switch via at least one of an inter-integrated circuit protocol (I2C), a universal asynchronous receiver/transmitter (UART), or a network.

6. The equipment rack of claim 1, wherein the first network device is a server.

7. The equipment rack of claim 1, wherein the first power supply unit and the first chassis management controller are attached to a power shelf.

8. The equipment rack of claim 5, wherein the management switch includes a management controller operable to determine rack status based on compiling the received status data from the first and second chassis units.

9. The equipment rack of claim 1, wherein the management controller is operable to determine the failure of communication of status data from the first chassis management controller, and the management controller is further operable to establish communication with the second chassis management controller when the failure of communication of status data from the first chassis management controller is determined.

10. A method of ensuring status reporting from an equipment rack having a management controller; a first chassis and a second chassis, wherein the first chassis includes a first power supply unit, a first system bus, and a first chassis management controller and a first network device; and wherein the second chassis includes a second power supply unit, a second system bus and a second chassis management controller and a second network device, the method comprising:
    providing status data from the first power supply unit to the first system bus;
    providing status data from the second power supply unit to the second system bus;
    establishing communication between the first chassis management controller and the first system bus to obtain status data from the first power supply unit;
    establishing communication between the first chassis management controller and the second system bus to obtain status data from the second power supply unit;
    relaying status data via the first chassis management controller to the management controller;
    establishing communication between the second chassis management controller and the second system bus to obtain status data from the second power supply unit;
    establishing communication between the second chassis management controller and the first system bus to obtain status data from the first power supply unit; and
    on determining that status data from the first chassis management controller is not relayed, initiating the relay of status data via the second chassis management controller to the management controller.

11. The method of claim 10, wherein the first power supply is one of a plurality of power supplies, each of the plurality of power supplies providing status data to the first system bus.

12. The method of claim 10, wherein the first network device is one of a plurality of network devices on the first chassis.

13. The method of claim 10, wherein the equipment rack includes a data switch connected to the first network device, the data switch in communication with one of the first or second network devices.

14. The method of claim 10, wherein the chassis management controller communicates with a management switch via at least one of an inter-integrated circuit protocol (I2C), a universal asynchronous receiver/transmitter (UART), or a network.

15. The method of claim 10, wherein the first network device is a server.

16. The method of claim 10, wherein the first power supply unit and the first chassis management controller are attached to a power shelf.

17. The method of claim 10, further comprising determining rack status based on the received status data from the first and second chassis units.

* * * * *